US012313285B2

(12) United States Patent
Renson

(10) Patent No.: US 12,313,285 B2
(45) Date of Patent: May 27, 2025

(54) AIR OUTLET WITH ELECTRICAL APPLIANCE

(71) Applicant: Prado Europe bv, Nieuwpoort (BE)

(72) Inventor: Thibault Louis Renson, Nieuwpoort (BE)

(73) Assignee: Prado Europe bv, Nieuwpoort (BE)

(*) Notice: Subject to any disclaimer, the term of this patent is extended or adjusted under 35 U.S.C. 154(b) by 0 days.

(21) Appl. No.: 17/758,950

(22) PCT Filed: Jan. 18, 2021

(86) PCT No.: PCT/IB2021/050349

§ 371 (c)(1),
(2) Date: Jul. 15, 2022

(87) PCT Pub. No.: WO2021/144774

PCT Pub. Date: Jul. 22, 2021

(65) Prior Publication Data

US 2023/0341146 A1 Oct. 26, 2023

(30) Foreign Application Priority Data

Jan. 16, 2020 (EP) .................................... 20152161
Jan. 17, 2020 (NL) .................................... 2024689
Oct. 6, 2020 (BE) .................................... 2020/5691

(51) Int. Cl.
*F24F 13/14* (2006.01)
*F21V 33/00* (2006.01)
(Continued)

(52) U.S. Cl.
CPC ...... *F24F 13/1486* (2013.01); *F21V 33/0088* (2013.01); *F24F 13/078* (2013.01); *F24F 13/12* (2013.01); *F24F 2221/02* (2013.01)

(58) Field of Classification Search
CPC .............. F21V 33/0088; F21V 33/0092; F24F 2221/02; F24F 13/078
See application file for complete search history.

(56) References Cited

U.S. PATENT DOCUMENTS 3,299,797 A * 1/1967 Dry ...................... F24F 13/078 362/345
2006/0052049 A1* 3/2006 Caldwell ................ F24F 11/76 454/302
2013/0266443 A1 10/2013 Yang et al.

FOREIGN PATENT DOCUMENTS

FR 2331755 A1 6/1977
GB 2480300 A * 11/2011 ........... F24F 12/006
(Continued)

OTHER PUBLICATIONS

ISR/WO dated May 10, 2021 from parent application PCT/IB2021/050349.

*Primary Examiner* — Alexander K Garlen
(74) *Attorney, Agent, or Firm* — Vorys, Sater, Seymour and Pease LLP

(57) ABSTRACT

The present invention relates to an electrical device provided in or attached to an air duct. The electrical device comprises a housing and an electrical body attached to the housing which extends at least partially into the housing and is adapted to connect a power source to an electrical element. The housing is provided with a passage for allowing air to flow between an end of the housing to be turned towards a room of the building and an end of the housing to be turned towards the air duct and for allowing air to flow in the space between an inner housing side and an outer side of the electrical body.

24 Claims, 10 Drawing Sheets

(51) Int. Cl.
*F24F 13/078* (2006.01)
*F24F 13/12* (2006.01)

(56) References Cited

FOREIGN PATENT DOCUMENTS

| | | | | | |
|---|---|---|---|---|---|
| GB | 2582259 | A | * | 9/2020 | ............. A62C 35/68 |
| KR | 2010067169 | A | * | 6/2010 | |
| KR | 20130117417 | A | * | 10/2013 | .............. F24F 13/06 |
| KR | 2015140066 | A | * | 12/2015 | |
| KR | 2017133122 | A | * | 12/2017 | .......... F24F 13/0254 |
| SE | 430101 | B | | 10/1983 | |
| WO | 2012174155 | A1 | | 12/2012 | |
| WO | WO-2015194960 | A1 | * | 12/2015 | ............ F24F 13/078 |
| WO | 2021114774 | A1 | | 7/2021 | |

* cited by examiner

AIR OUTLET WITH ELECTRICAL APPLIANCE

The present invention relates to an electrical device attachable in or to an air duct. The present invention further relates to a mechanical ventilation system for forced or unforced ventilation of a home, office building and the like, comprising at least one air duct and a ventilation device connected to said air duct in which such an electrical device is provided.

STATE OF THE ART

Many buildings have air ducts that provide passageways for the exchange, ventilation, circulation and/or movement of air through the surfaces (e.g. walls and ceilings) of the building. Buildings may have ventilation systems, which draw in "fresh" air from outside the building and expel "exhaust" air from inside the building. Fresh air can be drawn into a building or exhaust air can be expelled from a building through one or more air ducts. Some buildings contain other systems and/or devices, such as air-conditioning systems, heating systems and bathroom fans, that use air ducts to provide passageways for air to flow through the surfaces of buildings.

Typically, an air duct is associated with devices such as ventilation nozzles and/or ventilation grilles to direct air flows from the ventilation ducts. These devices at least partially conceal the end of the air duct from the occupant's view by covering the surface of and adjacent to the end of the air duct. As a result, a relatively large proportion of the surface area is occupied. Especially in small rooms, such as the toilet room, and/or if several air ducts are provided, this can have the disadvantage that too many fixtures, such as light fittings, smoke detectors, loudspeakers or heating panels are attached to the same surface, these fixtures are then very quickly perceived as too crowded and aesthetically unpleasing. In addition, ventilation nozzles and/or ventilation grilles themselves are often perceived as disturbing. There is therefore a need for electrical devices, in particular lighting fixtures, which are able to direct air flows out of ventilation ducts so that conventional ventilation nozzles and/or ventilation grilles become superfluous and invisible. Existing recessed or surface-mounted luminaires, however, have the disadvantage that they are not designed to guide airflows and cannot provide a sufficient flow, if any. In addition, the provision of known fittings in or before the end of the air duct has the disadvantage that the installation is more difficult because they are not designed to be connected to or in a ventilation duct (size, shape . . . ). This also means that the fasteners are sometimes visible, which can be experienced as aesthetically unpleasing.

PURPOSE OF THE INVENTION

An object of the invention may be to provide electrical devices of the aforementioned type which do not exhibit at least one of the disadvantages of the state of the art. A further object of the invention may be to provide electrical devices of the aforementioned type in a ventilation duct. A further object of the invention may be to provide electrical devices of the aforementioned type which also include fasteners to allow a user to attach parts thereto, for example a socket of a lamp connection or other current-carrying connection parts. A further object of the invention may be to provide these fasteners substantially invisible.

DESCRIPTION OF THE INVENTION

According to the invention, this purpose is achieved by a system that exhibits the technical characteristics of the first independent claim.

In a first aspect of the invention, which may occur in conjunction with the other aspects and embodiments of the invention described herein, the invention includes an electrical device for use in a ventilation duct of a building, or at one end thereof. The device includes a housing, wherein the housing provides a passageway for allowing air to flow between an end of the housing to be turned towards a room of the building and an end of the housing to be turned towards the air duct. For example, the housing may include a passageway from an inlet of the passageway at one end of the housing to an outlet of the passageway at the opposite end of the housing. The device further comprises an electrical body, preferably orientable, extending at least partly into the passageway and adapted to connect a power source to an electrical device and fasteners by means of which the housing and the electrical body are fixed together.

The passageway extends between an inner housing side and an outer side of the electrical body such that air can flow in the space between the inner housing side and the outer side of the electrical body. Viewed in a cross section perpendicular to a longitudinal direction of the housing or in the surface of the end of the housing to be turned towards the room of the building, the electric body may be completely surrounded by the passageway.

The presence of the passageway makes it possible to provide a passage of air through the housing and around the electrical body, in contrast to traditional electrical devices, e.g. light fittings, which do not allow any or only limited, unoptimised air flow through the housing of the electrical device.

Moreover, unlike traditional electrical equipment, the electrical device simultaneously provides a (central) electrical body around which airflow is possible and can be provided in or attached to an existing ventilation duct of a building. This makes it possible to install the electrical device in or on existing ventilation ducts without having to make significant adjustments, for example, during renovation work.

In embodiments according to the invention, the outer housing side may be adapted to close off an air channel, for example with an essentially circular cross-section, for example by providing an airtight sealing element on the housing that can close off the space between the housing and the air channel airtight such that, during operation, the air carried by the air channel flows primarily through the electrical device. In further embodiments according to the invention, the outer housing side may be adapted to form, in a cross section, a circle having a diameter of about 80, about 100, about 125 or about 160 mm. In still further or other embodiments according to the invention, a number of protrusions may be provided on the outer housing side which, in a cross section, form an imaginary circle having a diameter of about 80, about 100, about 125 or about 160 mm.

A first embodiment, which may occur in combination with the other aspects and embodiments of the invention described herein, relates to a aforementioned electrical device, wherein, in a first position, the longitudinal direction of the electrical body is parallel to or corresponds to the longitudinal direction of the housing, and optionally, in a second position, the longitudinal direction of the electrical body is tilted relative to the longitudinal direction of the housing.

In a second embodiment according to the invention, which may occur in combination with the other aspects and embodiments of the invention described herein, the fasteners are provided recessed or sunk into the housing. In a further embodiment according to the invention, the distance between the end of the housing to be turned towards the room of the building and an end of the fasteners to be turned towards the room of the building may be at least 1, 3 or 5 cm and/or at least 10%, 20% or 30% of an outer diameter of the housing or at least 10%, 20% or 30% of the diameter of the circumscribed circle, i.e. a circle passing through essentially all the vertices of a polygon, of a cross-section of the housing.

By providing the fasteners deep inside the enclosure, the fasteners are virtually invisible to people in the enclosure room. In addition, this makes tilting/aligning the electrical body in the housing easier. In embodiments according to the invention, the fastening means and other means extending into the passageway between the housing and the electrical body are provided deep inside the housing.

A third embodiment, which may occur in combination with the other aspects and embodiments of the invention described herein, relates to a aforementioned electrical device, wherein the passageway is arranged to allow air to flow at a flow rate of at least 5, 15, 25, 50 or $75^{m3/h}$.

In a fourth embodiment according to the invention, which may occur in combination with the other aspects and embodiments of the invention described herein, the electrical device may further comprise flow and/or flow control means for regulating the flow and/or airflow through the passageway, for example a flow controller such as a valve or fan. In particular, the flow and/or flow control means extend at least partly into the housing or passageway, in particular at least partly between the housing and the electrical body. In embodiments according to the invention, the flow and/or flow control means are provided deep within the housing.

In a further embodiment according to the invention, the flow and/or flow control means and the fasteners may be integrated into an adjustable valve with means for adjusting the position of flow control means of the assembly, which valve controls the flow or pressure of air flowing through the assembly.

In a fifth embodiment according to the invention, which may occur in combination with the other aspects and embodiments of the invention described herein, the electrical body extends from an end of the housing to a room of the building.

In embodiments according to the invention, an outer housing side may be adapted to be attached to or engage with the inner side of the air duct and an inner housing side, opposite the outer housing side, adapted to receive the fasteners.

In a sixth embodiment according to the invention, which may occur in combination with the other aspects and embodiments of the invention described herein, the electrical body is configured as a luminaire body adapted to receive a light source, whether or not detachable in a non-destructive manner, and connect thereto, e.g., an LED, to provide illumination.

A seventh embodiment, which may occur in combination with the other aspects and embodiments of the invention described herein, concerns a aforementioned electrical device, wherein the electrical device is modularly arranged such that the housing and the electrical body are attached to each other in a non-destructive manner. As a result, the electrical body is removable in a simple and reusable manner, preferably without tools.

In a second aspect of the invention, which may occur in combination with the other aspects and embodiments of the invention described herein, the invention includes a mechanical ventilation system comprising a ventilation device connected to an air duct in which an electrical device as described above is provided.

In embodiments according to the invention, the ventilation device is arranged to allow air to flow:

from the end of the housing facing a room of the building to the air duct end of the housing; or from the end of the housing facing the air duct to the room of the building to be turned.

In embodiments according to the invention, the air duct may have a predominantly circular cross-section with preferably a diameter of 80, 100, 125 or 160 mm. In embodiments according to the invention, the inner side of the air duct and the outer housing side may have a similar cross-section, for example a mainly circular cross-section, or different cross-sections, for example a mainly circular cross-section and a mainly polygonal cross-section.

In a third aspect of the invention, which may occur in combination with the other aspects and embodiments of the invention described herein, the invention includes a building comprising a ventilation system as described above.

Other aspects, advantages and salient features of the revelation will become clear to the practitioner from the following detailed description, which, in combination with the accompanying drawings, reveals various forms of the current revelation.

BRIEF DESCRIPTION OF THE FIGURES

The invention will be further illustrated below by an example of performance illustrated in the drawing. They are intended solely for illustrative purposes and not to limit the inventive concept defined by the appended claims.

DETAILED DESCRIPTION OF THE FIGURES

Figure 1:
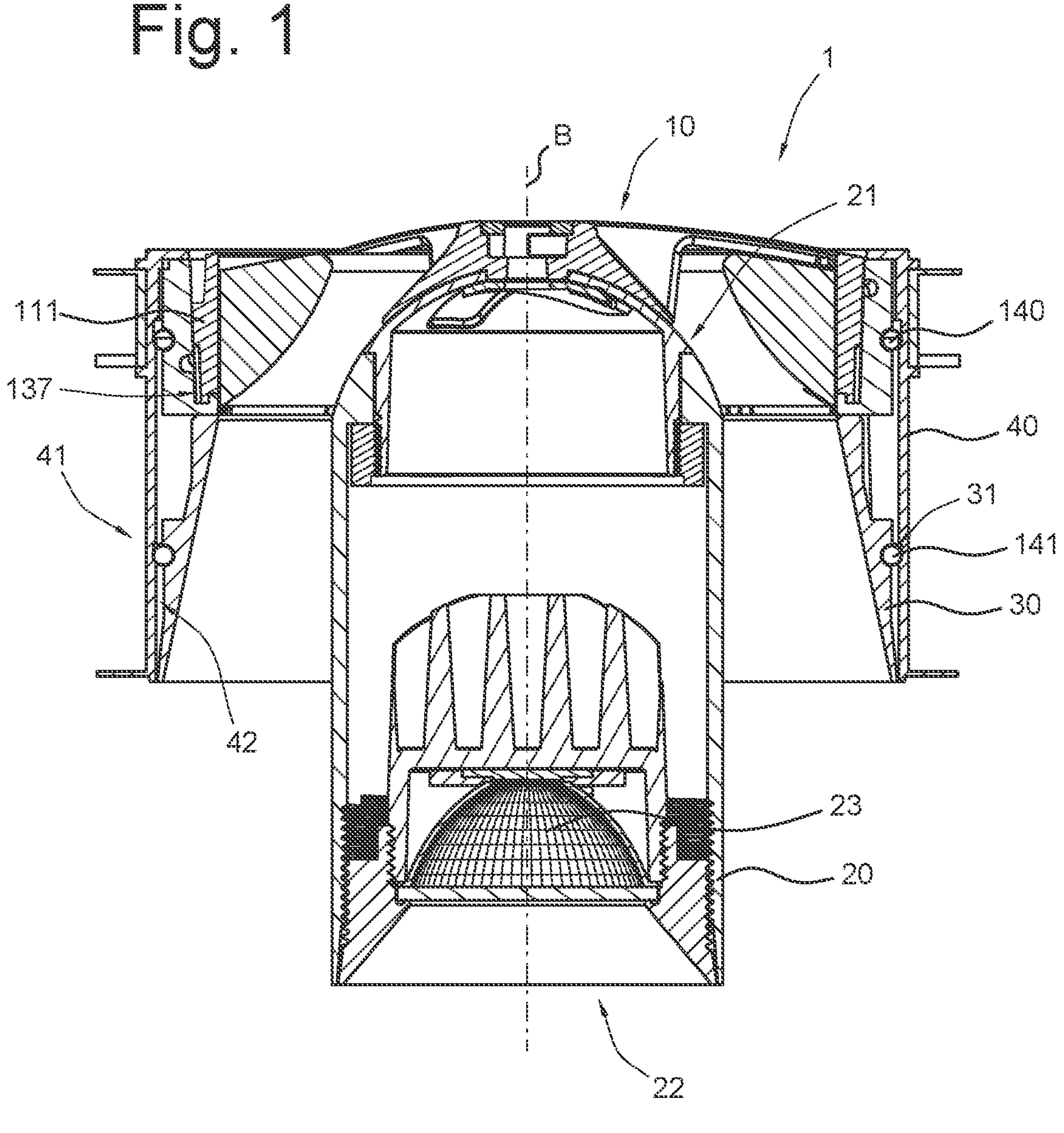
FIG. 1 shows a cross-section of an electrical device according to an embodiment of the invention.

The present invention will be described with reference to certain forms of execution and with reference to certain drawings but the invention is not limited in this respect and is determined solely by the claims. The drawings described are only schematic and non-restrictive. In the drawings the size of certain elements may be exaggerated and not drawn to scale for illustrative purposes. The shape, dimensions and relative sizes do not necessarily correspond to actual practical implementations of the invention.

Moreover, the terms first, second, third and the like are used in the description and in the claims to distinguish between similar elements and not necessarily to describe a sequential or chronological order. The terms are interchangeable under appropriate circumstances, and the embodiments of the invention may be applied in other sequences than those described or illustrated herein.

Moreover, the terms top, bottom, over, under and the like in the description and the claims are used for illustrative purposes and not necessarily to describe relative positions. The terms so used are interchangeable under appropriate circumstances and the embodiments of the invention described herein may be used in orientations other than those described or illustrated herein.

Furthermore, the various embodiments, although referred to as "preferred embodiments", should be understood as examples of how the invention can be carried out rather than as limitations on the scope of the invention.

The term "comprehensive", used in the conclusions, should not be interpreted as being limited to the means or steps mentioned thereafter; it does not exclude other elements or steps. The term should be interpreted as specifying the presence of the listed features, elements, steps or components referred to, but does not exclude the presence or addition of one or more other features, elements, steps or components, or groups thereof. Thus, the scope of the expression 'a facility comprising means A and B' should not be limited to facilities consisting only of components A and B. The meaning is that with regard to the present invention only the components A and B of the device are enumerated, and the claim should be further interpreted as including equivalents of these components.

Figure 2:
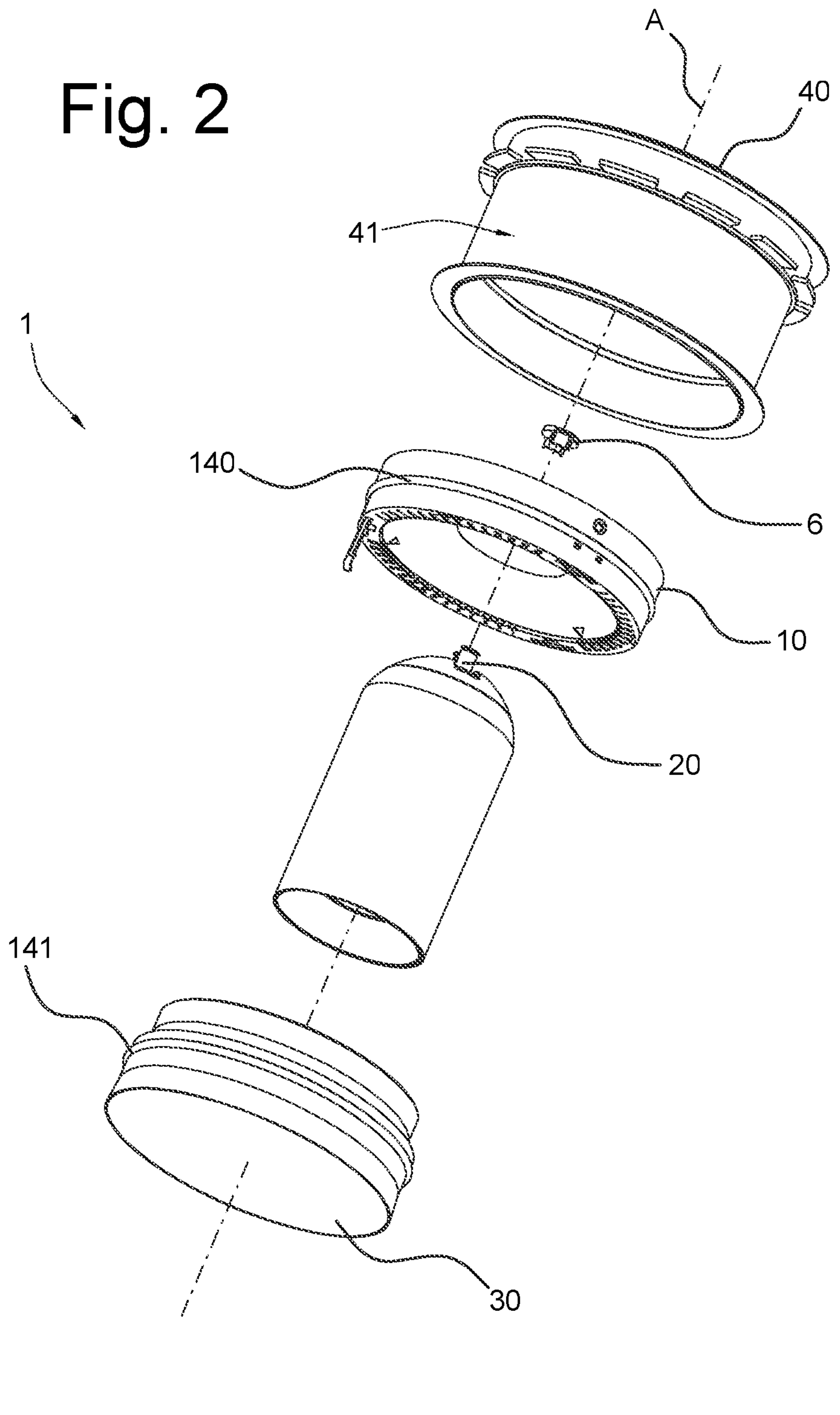
FIG. 2 shows an open view of the electrical equipment shown in FIG. 1.

FIGS. 1 and 2 show an electrical device 1 for use in an air duct, or at an end of the air duct, of a mechanical or natural ventilation system of a dwelling or the like. The electrical device 1 shown includes an annular housing 40 in which an assembly 10 of the electrical device 1 is mechanically retained via an annular coil spring 140. The electrical device 1 further includes a fixture portion 20, 23 which is connected to the assembly 10 and extends from a side of the assembly 10 arranged to be directed towards a chamber of the dwelling into which the air duct extends when the housing 40 is inserted into the air duct.

Figure 9:
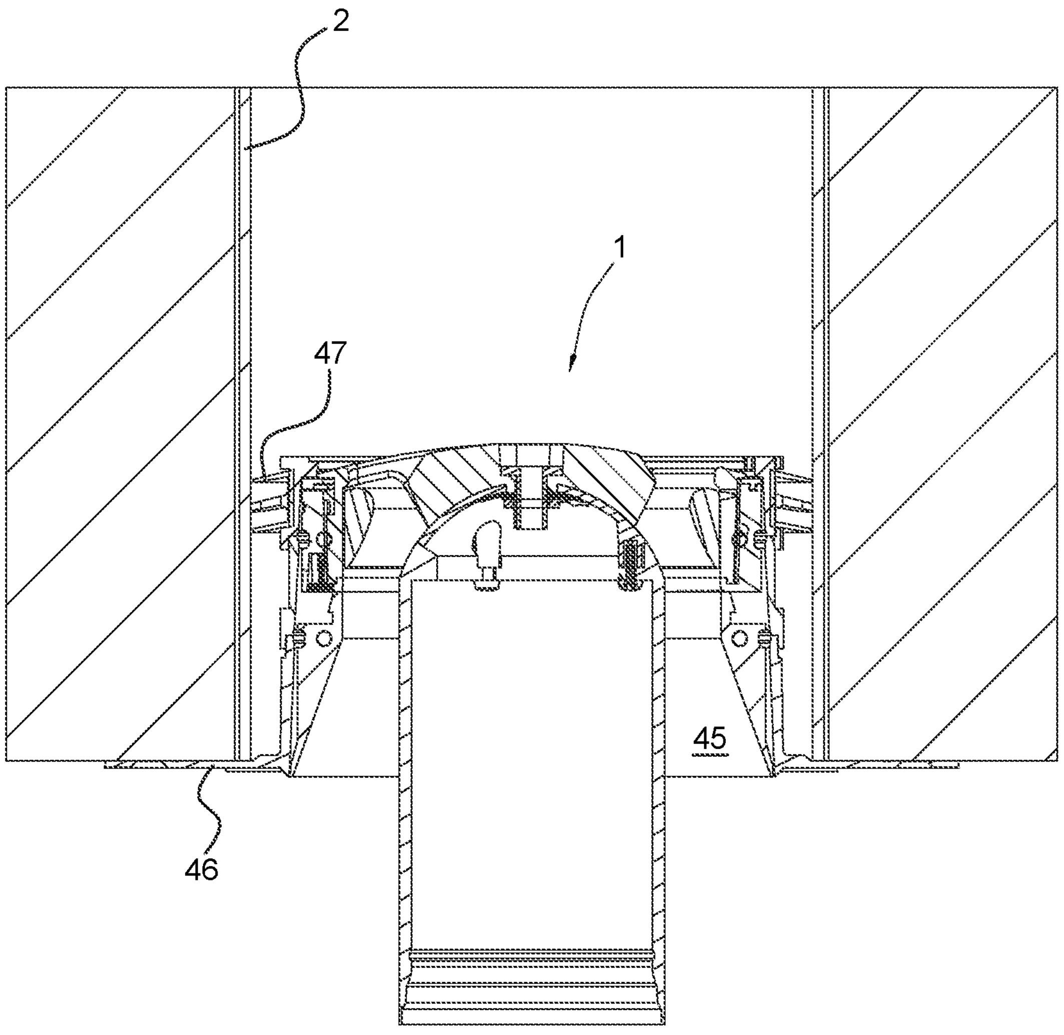
FIG. 9 shows a cross-section of an electrical device according to an embodiment of the invention mounted in an air duct.

The housing 40 has an outer housing side 41 that is adapted to be connected to and attached to or near the air duct 2. As shown in FIG. 9, the housing may include one or more attachment elements 46 that are provided in or behind a finish layer of the housing, for example a plaster layer, and one or more sealing elements 47 to connect the portion of the housing extending into the air duct to the air duct 2 and to seal the space between the housing 40 and the air duct 2 in a substantially airtight manner. In particular, the sealing elements 47 are located near the end of the housing to be turned towards the air duct. The fastening elements 46 and the sealing elements 47 may be located at opposite ends of the housing or at the same end of the housing. The housing 40 further has an inner housing side 42, opposite the outer housing side 41, which is adapted to be connected to the assembly 10. The assembly 10 includes an adjustable valve with adjustment means and flow control means for controlling the flow or pressure of air flowing through the housing 40 based on the position of the adjustment means.

Figure 7A:
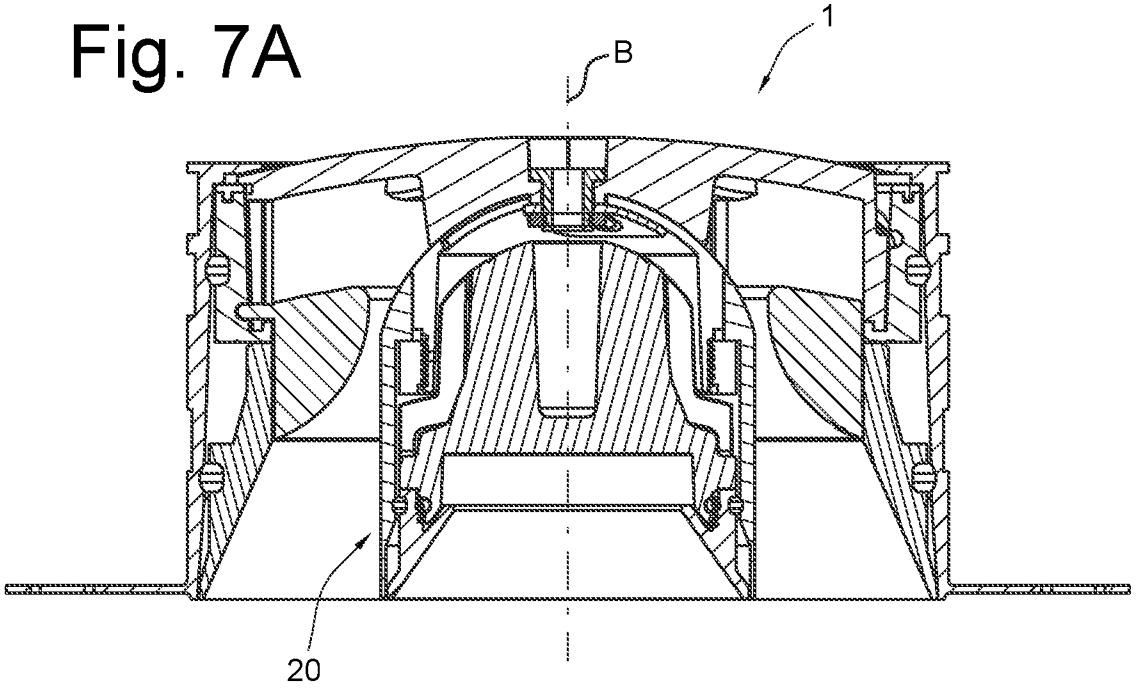
FIG. 7A shows a cross-section of an electrical device according to an embodiment of the invention in a first state.
Figure 7B:
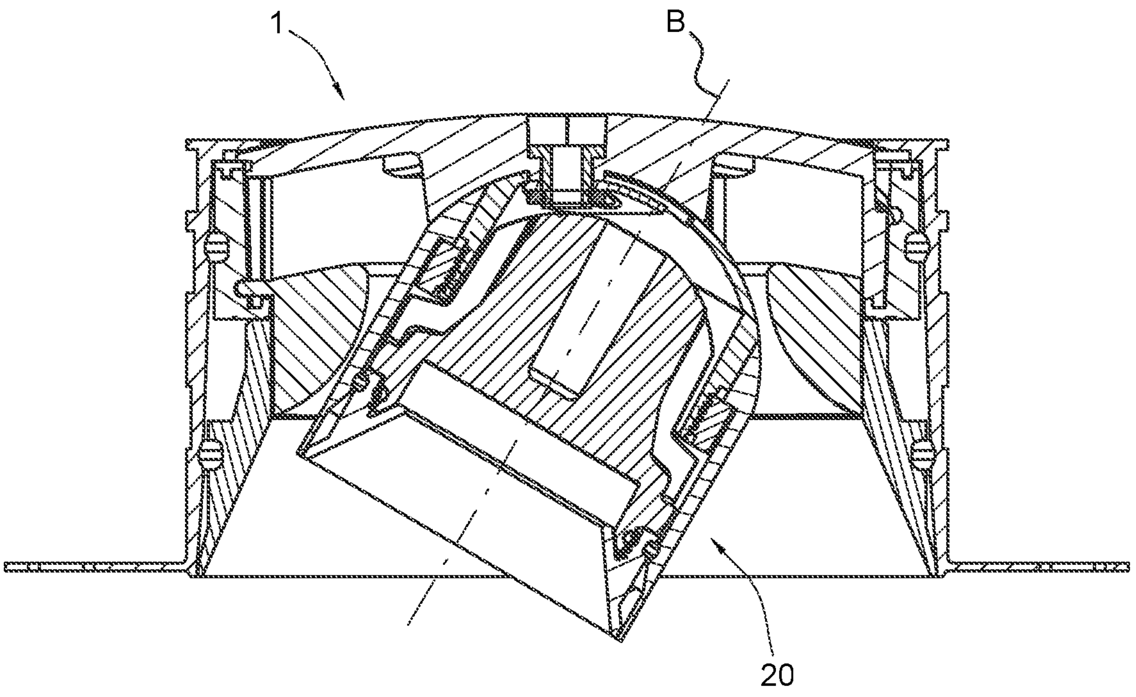
FIG. 7B shows the electrical device shown in FIG. 7*a* in a second state.

The fixture portion 20, 23 includes a luminaire body 20 adapted to be connected to and attached to the assembly 10 such that it is arranged facing the chamber when the housing 40 is inserted into the air duct, and is connected to an inner wall of the air duct. In particular, the luminaire body 20 may be connected to the adjusting means for adjusting the position of the adjusting means, thereby controlling the airflow or pressure of the air flowing through the housing 40 The proximal end 21 of the luminaire body 20 is adapted to be rotatably connected to the adjusting means so that axial rotation of the luminaire body 20 changes the position of the adjusting means and point rotation of the luminaire body 20 changes the direction of the luminaire body B relative to the assembly 10 without changing the position of the adjusting means, as shown in FIGS. 7A and 7B. The distal end 22, opposite the proximal end 21, of the luminaire body 20 is adapted to receive and connect a light source 23, e.g., an LED, to an electrical connection adapted to be connected to a power source.

Further, the electrical device 1 may include an annular guide element 30 to conduct air between the to-be-returned end of the housing 40 and the to-be-returned end of the assembly. As with the assembly 10, the guide element 30 may be mechanically retained via an annular coil spring 31.

The annular coil springs 140, 141 are adapted to be inserted into an annular slot 31, 134 of the assembly 10 or the guide element 30 to secure (lock and hold) the respective part to the housing 40. This makes it possible to remove the assembly 10 and the guide element 30 from the housing 40 to allow for easy cleaning of the electrical device 1 and the air duct 2. The coil springs may be, for example, compression springs and/or tilted helical springs. Advantageously, the coil spring 140, 141 produces a radial or axial force so that the coil spring 31, 140 remains in contact with the mating surface and can compensate for large adjustment tolerances, alignment and surface irregularities.

FIGS. 3, 4A-B, 5A-B and 6A-B show an assembly 100 for attaching the luminaire body 20 to the housing 40 and for controlling the airflow or pressure of air flowing through the housing 40. The assembly 100 includes a stationary portion 130, also called a stator, adapted to be stationary connected to the housing 40 or the air channel, and a rotatable assembly 110, 120, also called a rotor, rotatably connected to said stator 130. The rotatable assembly includes an inner rotor part 120 and an outer rotor part 110.

Figure 4A:
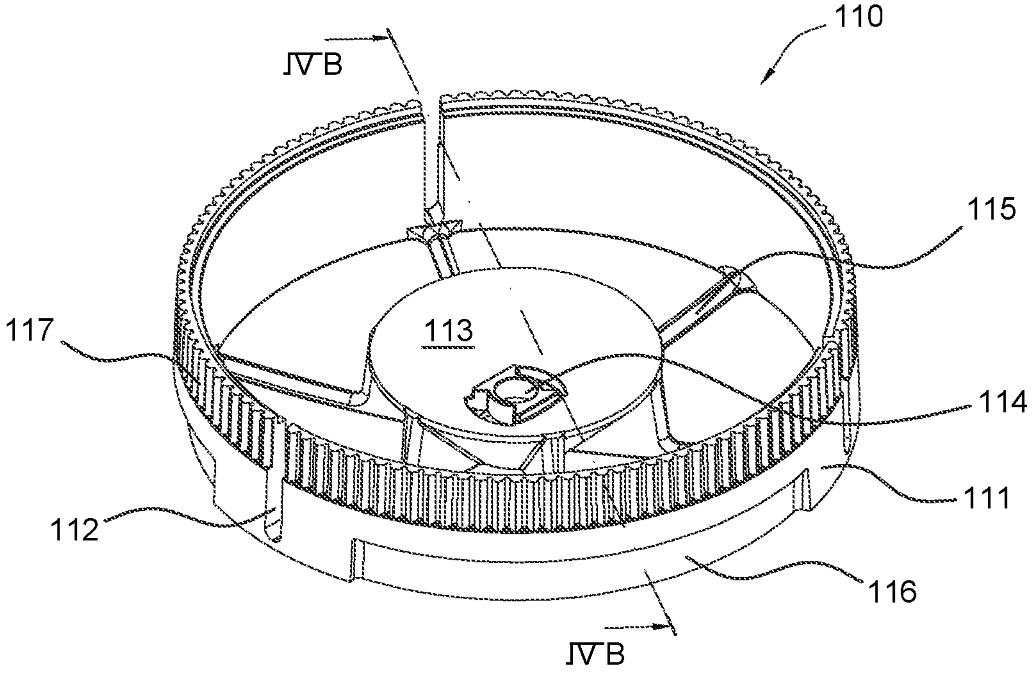
FIG. 4A shows in perspective the outer rotor part of the assembly shown in FIG. 3.
Figure 4B:
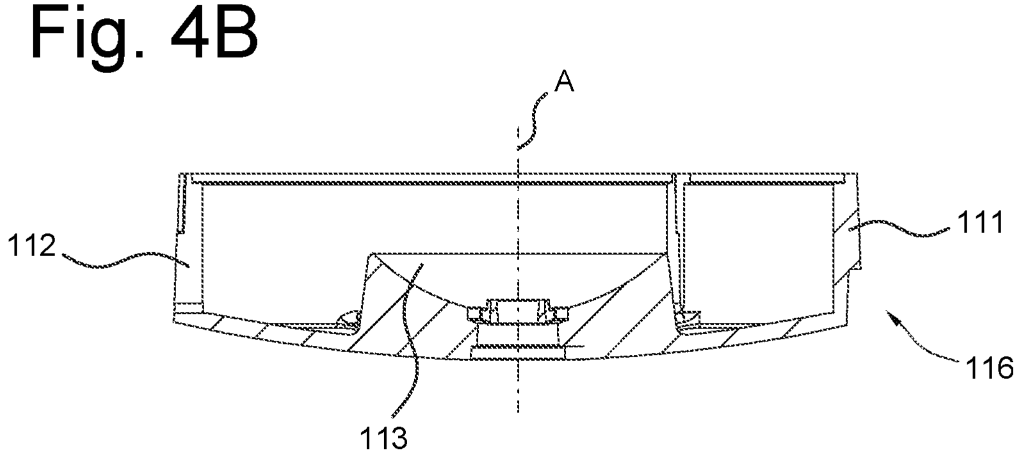
FIG. 4B shows in a cross-sectional view the outer rotor part shown in FIG. 4A.

As shown in FIGS. 4A-B, the outer rotor part 110 is formed by an annular outer rotor element 111 connected to a central bowl-shaped element 113 via a number of spacers 115, preferably positioned symmetrically around the bowl-shaped element 113, at the upper end of the outer rotor element 111. The outer rotor element 111 includes a number of parallel slots 112 extending from the lower end of the annular element 111 arranged to face the stator 130, and said slots 112 are preferably positioned symmetrically around the bowl-shaped element 113. The outer rotor element 111 further comprises a number of recessed surfaces 116 on the outer surface extending in an angular direction between the slots 112 and a number of corrugated surfaces 117 at the lower end of the outer surface extending in an angular direction between the slots 112. The bowl-shaped element 113 may include a connecting element 114 for connecting to an electrical body.

Figure 5A:
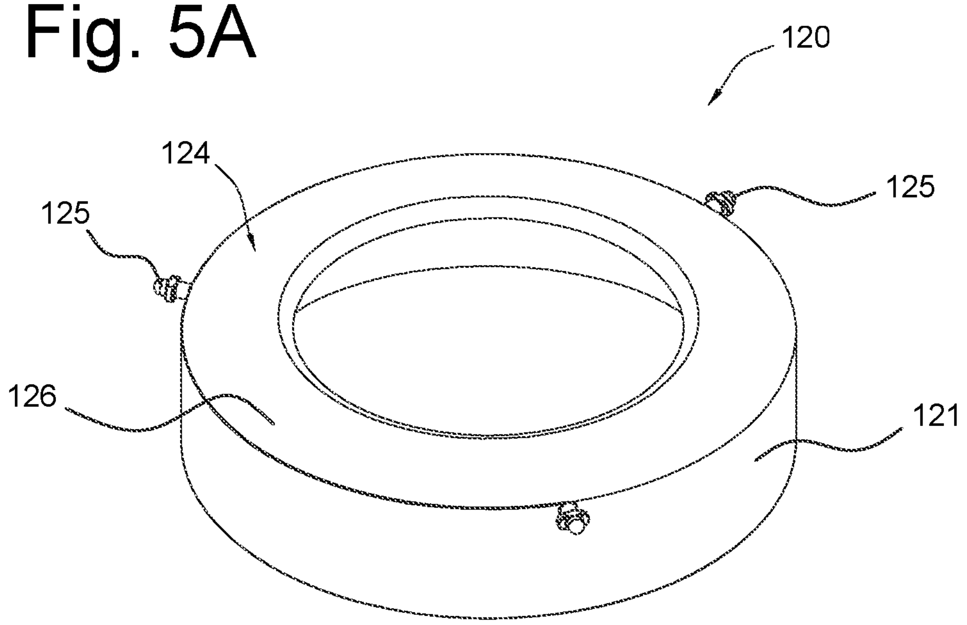
FIG. 5A shows in a perspective view the inner rotor part shown in FIG. 3.
Figure 5B:
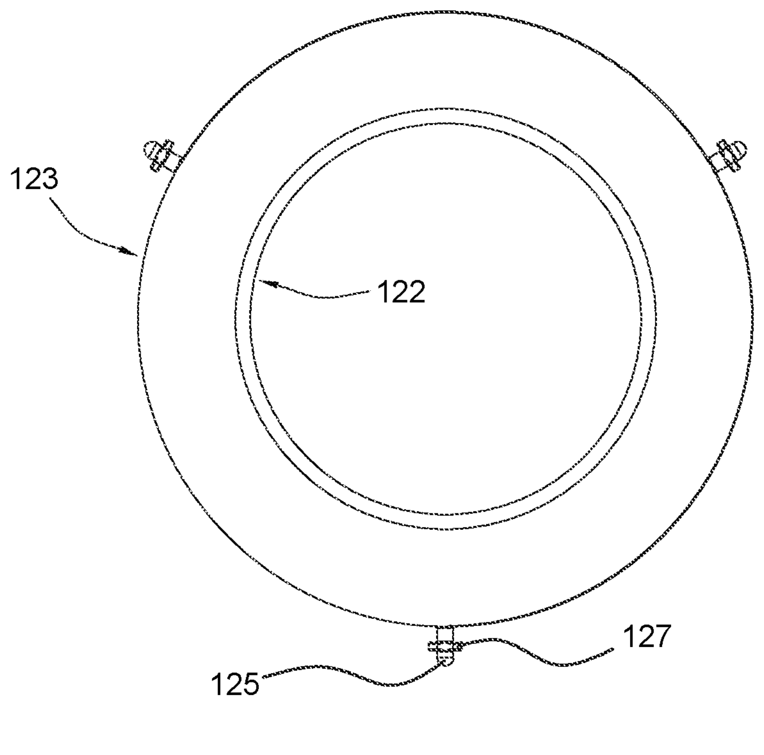
FIG. 5B shows in a top view the inner rotor part shown in FIG. 5A.

As shown in FIGS. 5A-B, the inner rotor part 120 is formed by an annular inner rotor element 121. At the upper end of the inner rotor element 124, which is arranged to face the outer rotor part 110 and away from the stator 130, the inner rotor part 120 is provided with an annular element 126 extending inwardly from the inner surface 122 of the inner rotor part and having a number of protrusions 125 on the outer surface 123, opposite the inner surface 122, of the inner rotor element 121. The number of projections 125 of the inner rotor part 120 and the number of parallel slots 112 of the outer rotor part 110 are positioned at corresponding angular positions in the angular direction, preferably arranged symmetrically around the respective annular member. As such, when the inner rotor part 120 is inserted into the outer rotor part 110, each protrusion 125 extends through a respective slot 112 to a widened portion of the protrusion 127 provided outside the outer rotor part 110, wherein the width of the widened portion of the protrusion 127 is greater than the width of the respective slot 112. Therefore, the protrusion 125 will prevent movement of the inner and outer rotor elements 111, 121 relative to each other in a plane perpendicular to the axial direction A, e.g., by translation in radial direction or by rotation in angular direction.

Figure 3:
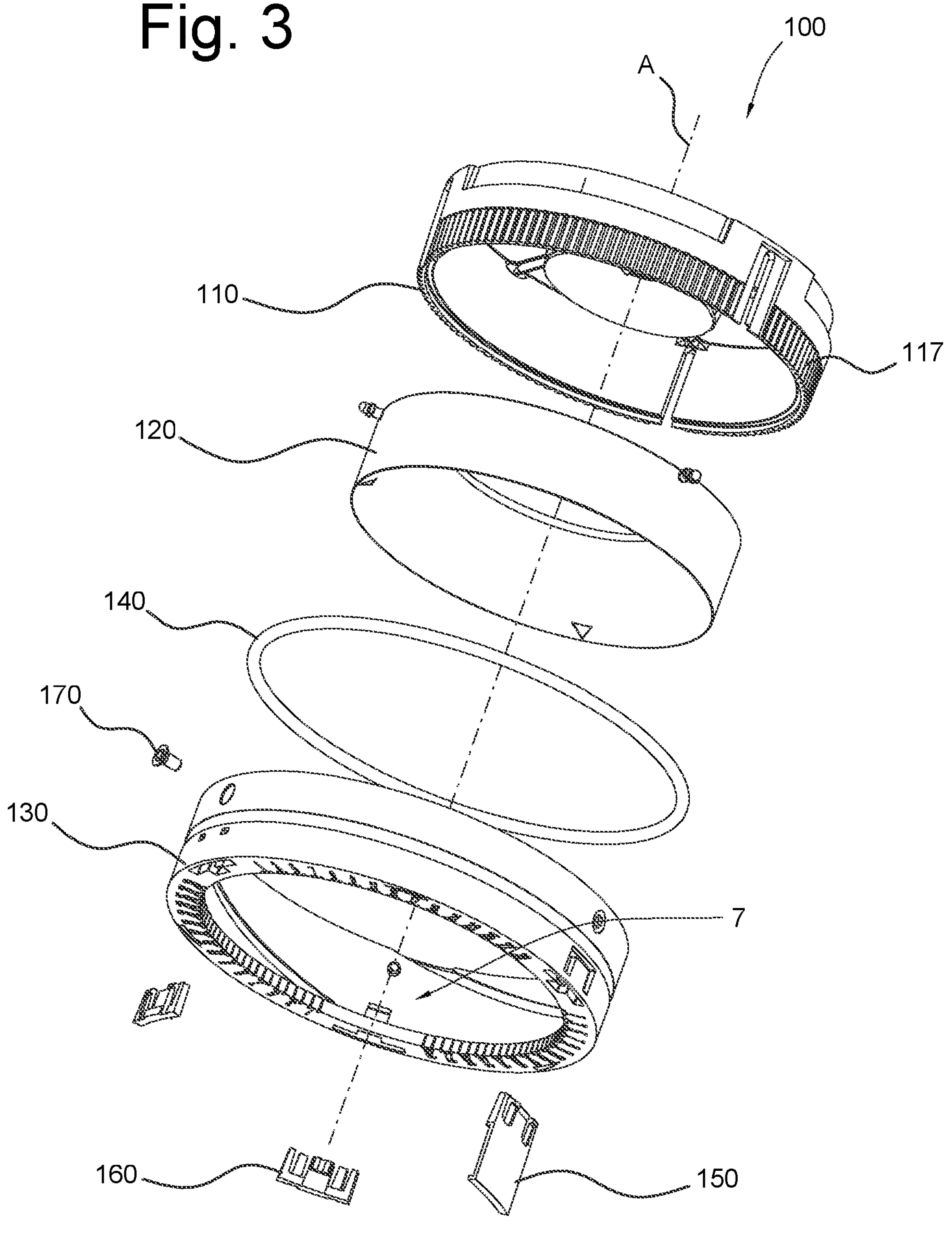
FIG. 3 shows in open view an assembly according to an embodiment of the invention.
Figure 6A:
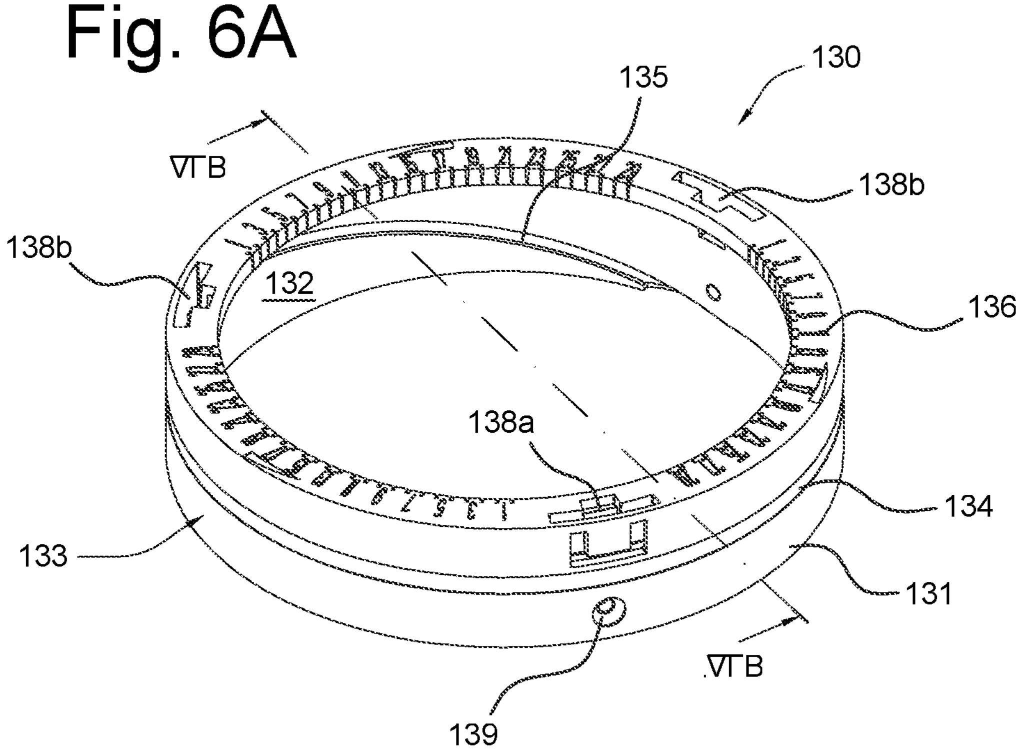
FIG. 6A shows in perspective the stator shown in FIG. 3.
Figure 6B:
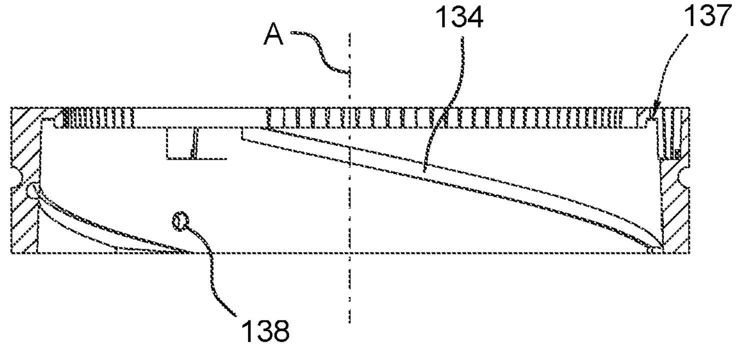
FIG. 6B shows in a cross-sectional view the stator shown in FIG. 6A.

As shown in FIGS. 6A-B, the stator 130 is formed by an annular stator member 131 wherein an outer slot 134 is arranged on the outer surface 133 of the stator member 131 to receive the annular coil spring 140, shown in FIG. 3, to mechanically hold the stator 130 in the air channel, and wherein at least an inner slot 135 is arranged on the inner surface 132 of the stator element 131 to receive and guide the number of projections 125 of the inner rotor part 120. At least one inner slot 135 is adapted to guide the number of protrusions 125 and thereby move the inner rotor part 120 axially when the number of protrusions 125 is rotated around the central axis A. At the lower end of the stator 130, which is arranged to be facing a chamber of the housing, the stator 130 further comprises an annular element 136. At a lower end of the annular element 136, the annular element 136 is provided with visual indications regarding the axial position of the at least one inner slot 135 at a predetermined angular position, and, at the opposite upper end, the annular element 136 is adapted to include the lower end of the outer rotor element 111 in an annular recess 137, as shown in FIG. 1.

The stator 130 further includes openings 138*a*, 138*b*, of a locking mechanism and a ratchet mechanism respectively, which extend axially from the lower end of the stator element 131 to permit insertion of a complementary element by a user when installed and extend radially across the inner surface 132 to permit interaction between the complementary element and the outer surface of the outer rotor element 111.

By inserting locking means 150 into the aperture 138*a*, the locking means 150 interact with the corrugated surface 117 of the outer rotor part 110 to lock the relative position between the stator 130 and the rotor parts 110, 120. By inserting pawl means 160 into the opening 138*b*, the pawl means 160 work in conjunction with the corrugated surface 117 of the outer rotor part 110 to limit rotational movement between the stator 130 and the rotor parts 110, 120 to clockwise or counterclockwise movement.

The stator element 131 further includes a plurality of recessed holes 139 on its outer surface to receive a respective screw or the like 170 extending into a respective recessed surface 116 of the outer rotor element 111 to mechanically hold the outer rotor part 110, and thereby also the inner rotor part 120, within the annular stator element 131, i.e., in the space defined by the annular stator member 131 and the lower ring 136. The screw 170 and recessed surfaces 116 further limit the rotational movement of the outer rotor part 110 in the angular direction.

Figure 8A:
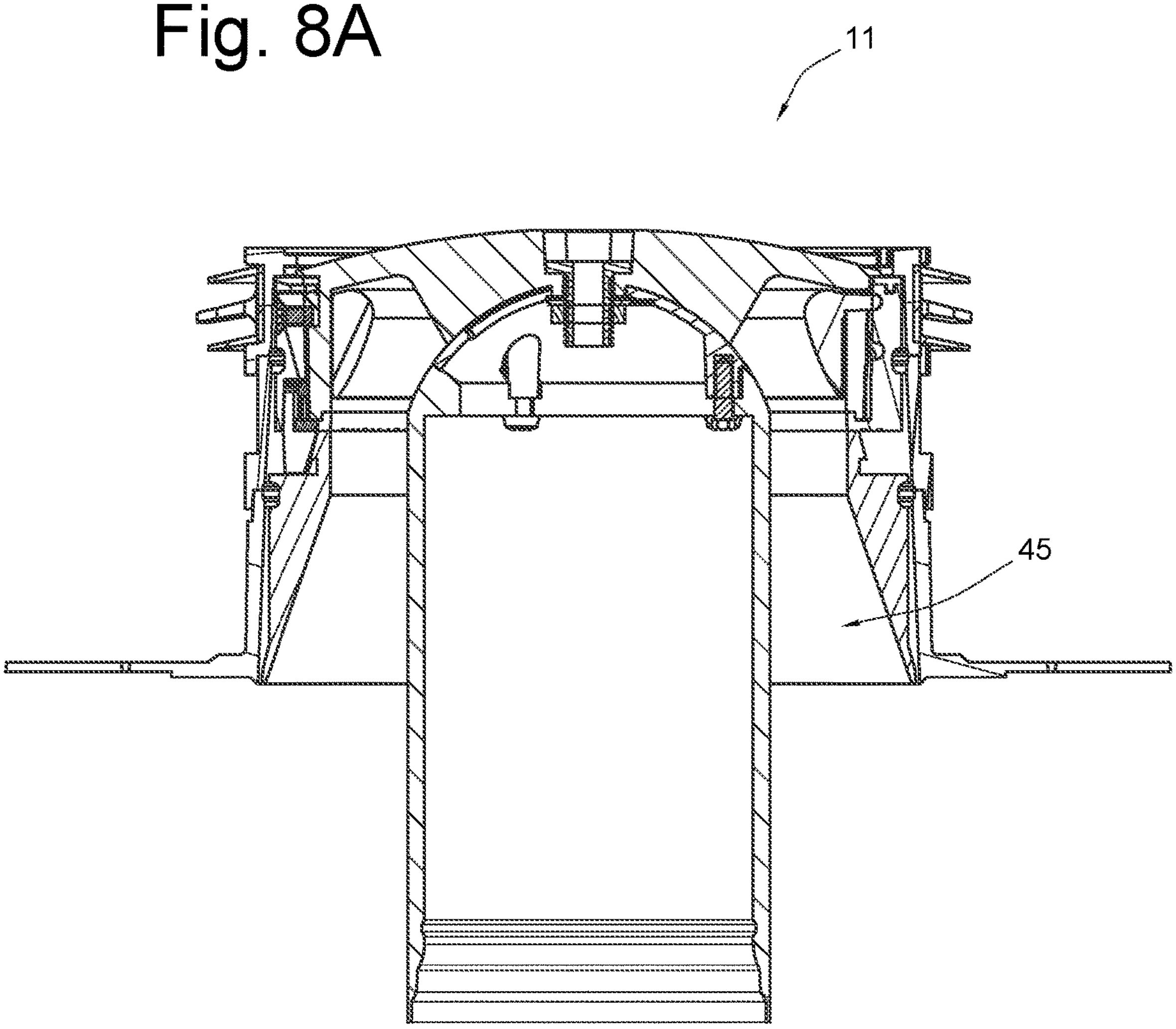
FIG. 8A shows a cross section of an electrical device according to an embodiment of the invention in an open state.
Figure 8B:
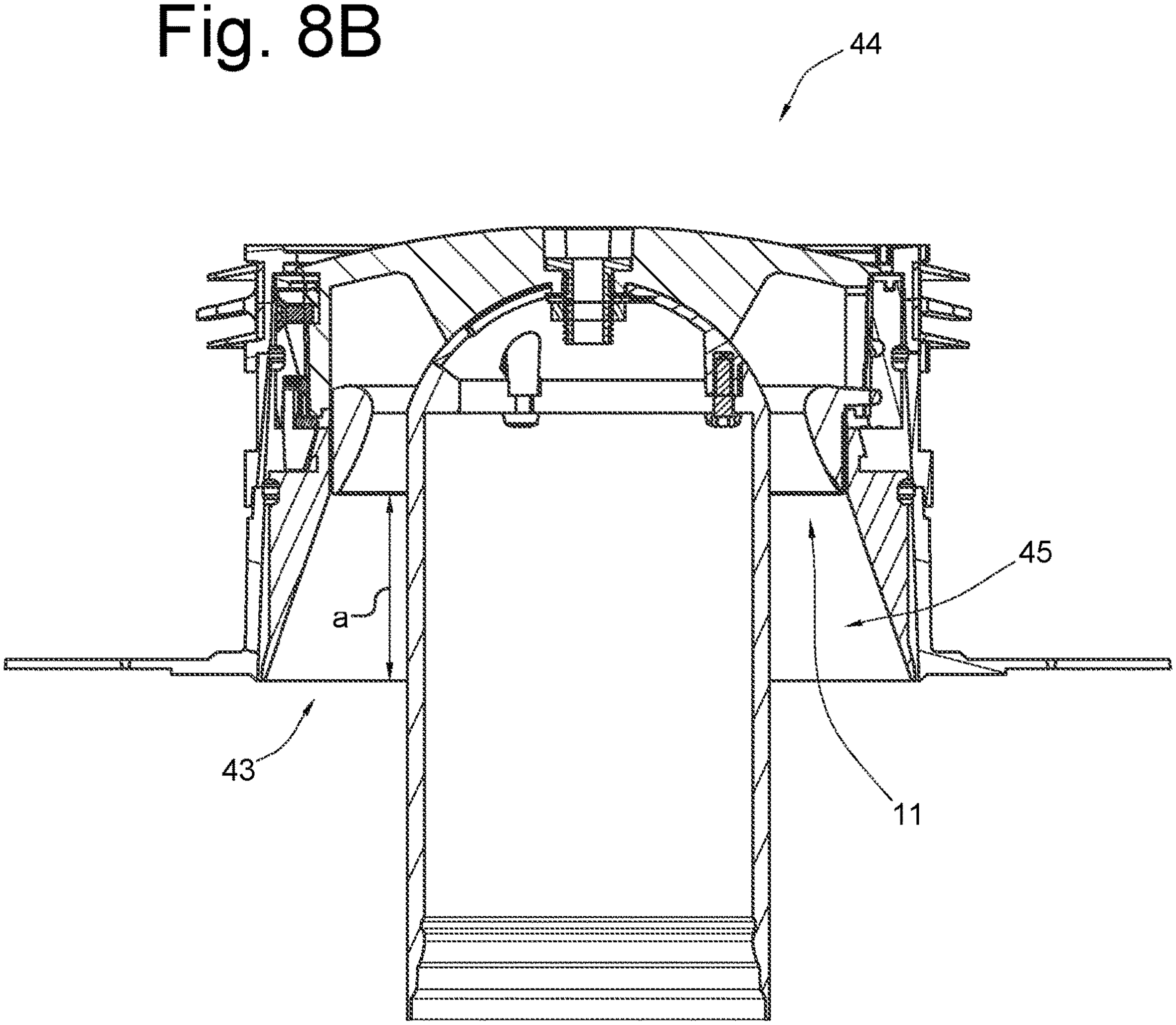
FIG. 8B shows the electrical device shown in FIG. 8*a* in a closed state.

Next, the working principle of the assembly of the present invention will be described with reference to FIGS. 8A and 8B. As mentioned above, the assembly 10, 100 includes adjustment means and flow control means for controlling the flow or pressure of air flowing through the assembly 10, 100.

The adjusting means includes the bowl-shaped element 113, optionally attached to the proximal end 21, which is rigidly connected to the outer rotor element 111. By rotating the bowl-shaped element 113, the position of the assembly 10, 100 can be changed. to the closed position or to the open position, depending on the direction of rotation. Rotating the bowl-shaped element 113 causes the outer rotor element 111 to rotate in the same direction of rotation, and thus the protrusions 125 of the inner rotor element 121 present in the slots of the outer rotor element 112.

The protrusions 125 extending through the slots of the outer rotor element 112 and included in the at least one inner slot 135 of the stator element 131 are guided through the at least one inner slot 135 when the bowl-shaped element 113 is rotated. to the fact that the at least one inner slot 135 extends in axial direction A, the axial position of the guided protrusions 125 is changed relative to the stator 130 and the outer rotor part 110. As a result, the axial position of the annular element 126 of the inner rotor part 110 is changed relative to the bowl-shaped element 113. Therefore, the flow or pressure of air flowing through the assembly 10, 100 is adjusted because the air passage through the assembly is determined by the space between the bowl-shaped element 113 and the annular element 126. The flow rate is increased by rotating the bowl-shaped element 113 clockwise and the flow rate is decreased by rotating the bowl-shaped element 113 counterclockwise, or vice versa.

Other alternatives and equivalent implementations of the present invention are conceivable within the idea of the invention, as will be apparent to those skilled in the art. The scope of the invention is limited only by the appended claims.

LIST OF REFERENCE MARKS

1. Electrical equipment
2. Ventilation duct
10, 100. Compound
11. To return to the Building Room at the end of the Assembly
20. Luminaire body
21. Proximal end
22. Distal end
23. Lamp
30. Guide element
31. Outer Slot of the Guiding Element
40. Housing
41. Outer housing side
42. Inner housing side
43. To return to the Room of the Building end of the Enclosure

44. To return to the Building Air Duct end of the Enclosure
45. Passage
46. Fixing element
47. Sealing element
110. Outer Rotor Part
111. Outer Rotor Element
112. Slot of the Outer Rotor Element
113. Bowl-shaped element
114. Connecting element
115. Spacer
116. Recessed Surface
117. Corrugated Surface
120. Inner Rotor Part
121. Inner Rotor Element
122. Inner Surface of the Inner Rotor Element
123. Outer Surface of the Inner Rotor Element
124. Upper End of the Inner Rotor Element
125. Protrusion
126. Annular Element
127. Nut
130. Stator
131. Stator element
132. Inner surface of stator element
133. External surface of stator element
134. Outer Slot
135. Inner slot
136. Ring-shaped element with visual indications
137. Annular recess
138A. Opening the locking mechanism
138B Opening of the ratchet mechanism
139. Recessed hole
140, 141. Tilted spring
150. Locking mechanism means
160. Ratchet mechanism means
170. Screw
A. Central Axis
B. Axis of the luminaire body
a. Distance between the housing end to be turned towards the room of the building and a housing end to be turned towards the room of the building

The invention claimed is:

1. Electrical device for use in or on an air duct for ventilation of a building, comprising:
- a housing including an inner side;
- an electrical body attached to the housing and extending at least partially into the housing and adapted to connect a power source to an electrical element; and
- an annular element defining an aperture, wherein the electrical body is disposed in the aperture, and wherein the annular element is axially moveable relative to the electrical body between one or more axial positions along a central axis of the electrical body,
- wherein the housing is provided with a passage for allowing air to flow between an end of the housing to be turned towards a room of the building and an end of the housing to be turned towards the air duct and for allowing air to flow in the space between the inner side of the housing and an outer side of the electrical body, wherein the annular element is axially moveable between the one or more axial positions to change a flow property of the air through the passage.

2. The electrical device according to claim 1, wherein, in a cross section perpendicular to a longitudinal direction of the housing, the electrical body is completely surrounded by the passage.

3. The electrical device according to claim 2, wherein, in the surface of the end of the housing to be turned to the room of the building, the electrical body is completely surrounded by the passage.

4. The electrical device according to claim 1, comprising a fastener coupling the housing and the electrical body to each other.

5. The electrical device according to claim 4, whereby the distance (a) between the end of the housing to be turned towards the room of the building and an end of the fastener to be turned towards the room of the building is at least 1 cm.

6. The electrical device according to claim 4, wherein the distance (a) between the end of the housing to be turned towards the room of the building and an end of the fastener to be turned towards the room of the building is at least 10% of an outer diameter of the housing or at least 10% of the diameter of the circumscribed circle of a section of the housing.

7. The electrical device according to claim 1, in which the passage is designed for air flow at a rate of at least 25 $^{m3/h}$.

8. The electrical device according to claim 1, wherein the electrical body is protruding from the end of the housing to be turned towards the room of the building.

9. The electrical device according to claim 1, wherein an outer housing side of the housing is adapted to be attached to or to be engaged with the inner side of the air duct and an inner housing side, opposite the outer housing side, which is adapted to receive the fastener.

10. The electrical device according to claim 1, where the electrical device is of modular design in such a way that the housing and the electrical body are detachable attached to each other in a non-destructive way.

11. A luminaire in the form of a device according to claim 1, wherein the electrical body is configured as a luminaire body adapted to receive and electrically connect to it a light source, e.g. an LED, to provide illumination.

12. The luminaire according to claim 11, where the light source is integrated in the luminaire body.

13. A mechanical ventilation system comprising a ventilation device and an air duct connected to the ventilation device, in which the electrical device according to claim 1 is at least partially installed.

14. The mechanical ventilation system according to claim 13, wherein the ventilation device is arranged to allow air to flow from the end of the housing facing a room of the building to the end of the housing facing the air duct.

15. The mechanical ventilation system according to claim 13, wherein the ventilation device is arranged to allow air to flow from the end of the housing facing the air duct to the end of the housing facing a room of the building.

16. A building comprising the ventilation system according to claim 13.

17. The electrical device according to claim 1, wherein the electrical body being pivotable from a first position where the central axis of the electric body is parallel to or coaxial with a central axis of the housing to a second position where the central axis of the electric body is tilted relative to the central axis of the housing.

18. An electrical device, comprising:
- an outer rotor part including a bowl-shaped element, a plurality of first apertures arranged around the bowl-shaped element, and a first slot;
- a stator element including an outer surface, an inner surface defining a second aperture, and a second slot formed on the inner surface;
- an inner rotor part at least partially disposed within the second aperture of the stator element and at least partially disposed within the outer rotor part, the inner rotor part including an outer surface, an annular element defining a second aperture, and a protrusion extending from the outer surface of the inner rotor part and partially disposed in the first slot and the second slot, wherein rotation of the outer rotor part causes the protrusion to slide within the second slot to change an axial position of the inner rotor part relative to the outer rotor part; and an electrical body disposed within the second aperture and engaged with the bowl element.

19. The electrical device of claim 18, further comprising:

an annular coil spring disposed in a third slot formed on the outer surface of the stator element.

20. The electrical device of claim 18, wherein the electrical body is pivotable from a first position where a central axis of the electric body is coaxial with a central axis of the inner rotor port to a second position where the central axis of the electric body is tilted relative to the central axis of the inner rotor part.

21. The electrical device of claim 18, further comprising a light source coupled to the electrical body.

22. The electrical device of claim 18, wherein the outer surface of the outer rotor part includes a number of corrugated surfaces.

23. The electrical device of claim 22, wherein the stator element includes a first opening.

24. The electrical device of claim 23, further comprising:

a lock insertable into the first opening to interact with the number of corrugated surfaces to lock the relative position between the stator element, the outer rotor part, and the inner rotor part.

* * * * *